United States Patent
Bindels et al.

(10) Patent No.: US 6,863,918 B2
(45) Date of Patent: Mar. 8, 2005

(54) INFANT FORMULA WITH IMPROVED PROTEIN CONTENT

(75) Inventors: Jacob Geert Bindels, Zoetermeer (NL); Antonie Van Baalen, Arnhem (NL); Robert Johan Joseph Hageman, Wageningen (NL); Peti Huybers, Cuyk (NL); Liliane Marie-Rose Louisa Dominique Dumon, Dilbeek (BE)

(73) Assignee: N.V. Nutricia, MA Zoetermeer (NL)

( * ) Notice: Subject to any disclaimer, the term of this patent is extended or adjusted under 35 U.S.C. 154(b) by 195 days.

(21) Appl. No.: 10/149,986

(22) PCT Filed: Dec. 13, 2000

(86) PCT No.: PCT/NL00/00913

§ 371 (c)(1),
(2), (4) Date: Oct. 11, 2002

(87) PCT Pub. No.: WO01/41581

PCT Pub. Date: Jun. 14, 2001

(65) Prior Publication Data

US 2003/0072865 A1 Apr. 17, 2003

(30) Foreign Application Priority Data

Dec. 13, 1999 (EP) .............................. 99204287

(51) Int. Cl.$^7$ .............................. A23J 1/00; A23J 1/20; A23J 3/10; A23J 3/20; A23L 2/38
(52) U.S. Cl. .......................... 426/590; 426/62; 426/801; 426/658; 435/219; 435/221; 435/224; 435/225
(58) Field of Search ................................ 426/801, 590, 426/62, 658; 435/219–225

(56) References Cited

U.S. PATENT DOCUMENTS

| | | | | |
|---|---|---|---|---|
| 3,649,295 A | * | 3/1972 | Bernhart .................. 426/598 |
| 5,000,975 A | * | 3/1991 | Tomarelli .................. 426/602 |
| 5,013,569 A | * | 5/1991 | Rubin ...................... 426/585 |
| 5,486,461 A | | 1/1996 | Nielsen |
| 5,601,860 A | * | 2/1997 | Lien et al. .................. 426/72 |
| 5,658,714 A | | 8/1997 | Westfall et al. |
| 5,700,513 A | * | 12/1997 | Mulchandani et al. ....... 426/590 |
| 5,906,982 A | * | 5/1999 | Prieto et al. ................ 514/61 |
| 5,922,766 A | * | 7/1999 | Acosta et al. ............... 514/561 |
| 5,994,113 A | | 11/1999 | Kauppinen et al. |
| 6,083,934 A | * | 7/2000 | Prieto et al. ................ 514/61 |
| 6,099,871 A | * | 8/2000 | Martinez .................... 426/2 |
| 6,146,670 A | * | 11/2000 | Prieto et al. ................ 426/72 |

FOREIGN PATENT DOCUMENTS

| | | |
|---|---|---|
| EP | 0 376 628 | 7/1990 |
| EP | 0 671 126 A1 | 9/1995 |
| EP | 0 846 422 A1 | 6/1998 |

OTHER PUBLICATIONS

XP–00213734, J. Agric. Food Chem., "Proteolytic and Peptidolytic Activities Incommercial Pancreatic Protease Preparations and Their Relationship to Some Whey Protein Hydrolysate Characteristics", 1994, pp. 2973–2981.

J.J. Pahud et al., "Oral Sensitization to Food Proteins in Animal Models, a Basis for the Development of Hypoallergenic Infant Formula," *Proc. of the Tropical Conference*, Virginia 1985, AOAC, pp. 264–271.

G.L. Piacentini et al., "Ability of a New Infant Formula Prepared From Partially Hydrolyzed Bovine Whey to Induce Anaphylactic Sensitization: Evaluation in a Guinea Pig Model," *Allergy*, V. 49, 1994, pp. 361–364.

* cited by examiner

*Primary Examiner*—Carolyn Paden
(74) *Attorney, Agent, or Firm*—Young & Thompson

(57) ABSTRACT

An improved infant formula resulting in reduced constipation, abdominal discomfort and gastrointestinal problems, comprises at least one protein component having a phosphorus content of less than 0.75 g P/100 g protein, and at least one lipid component that can be easily digested by an infant. Preferably, it further comprises at least one pre-biotic component, and at least one viscosity-improving component. The protein fraction of the formula is preferably a hydrolysate prepared by hydrolysing a protein starting material, especially a whey protein with a combination of at least one endo- and at least one exoproteinase.

29 Claims, No Drawings

INFANT FORMULA WITH IMPROVED PROTEIN CONTENT

The present invention relates to an improved infant formula containing at least an easily digestible lipid component and an improved protein component.

BACKGROUND OF THE INVENTION

In infants, in particularly in infants of less than 6 months old, the digestive system has to develop and adapt to food. Because of this, for the first months of their lives, infants are usually fed specialised infant formulas.

Usually, such infant formulas are well tolerated. However, in a limited number of cases, conventional formulas may lead to minor problems, in a particular with respect to the processes that occur in the gastrointestinal tract.

More in particular, in the research leading up to the present invention, it was acknowledged by the inventors that conventional formulas may lead to undesired disturbances in the natural gut flora and/or to an unnatural gut flora Also, it was acknowledged that conventional infant formulas may provide the wrong type and/or the wrong amounts of substrate; and/or may have the wrong composition of diet components.

Such defects in conventional formulas may lead to undesired processes in the gastro-intestinal tract and/or to an undesired disturbance of the natural processes. In turn, this may lead to symptoms such as:

- an undesirable constitution of faeces (e.g. diarrhoea, constipation or unnatural colour tone);
- high local gas production, which may result in cramps in the infant gut and/or to bloating and delayed stomach emptying;
- a decreased bioavailability of divalent cations;
- undesired levels of aggressive agents in the faeces, in particular agents that can irritate and/or damage the epithelial cells (such as those of the lining of the gastrointestinal tract and/or the skin) including but not limited to proteases.

As a result, infants which are fed conventional formulas may suffer from reduced appetite and/or regurgitation of food (often in case of disturbances in the gut). Also, disturbances in the natural process of stomach emptying and an irregular consumption pattern may occur, which may cause hunger, as a result of which infants may consume large volumes of formula too hastily, which in turn may lead to excessive aerophagia and/or regurgitation.

Also, as a result of the problems, causes and/or factors indicated above, infants which are fed conventional formulas may suffer from an impaired immune function which may become evident in rapid development of a rash on the skin of the bottom; under-nourishment (impaired growth), malfunctioning (colic) and even damage to the gut (intolerances to food components).

Thus, there is a need for an infant formula that has improved characteristics with respect to the prevention and/or alleviation of one or more, and preferably all, of the above-mentioned problems. The present invention provides such an infant formula.

In this respect, it is of importance that the formula of the invention is capable of preventing, alleviating and/or reducing all of the above-mentioned problems simultaneously. This is because, in particular for a parent, it may be difficult to establish the specific cause of the problem(s). Thus, by using an infant formula of the invention that can prevent and/or alleviates all of these problems simultaneously, parents may be assured that by the use of the infant formula of the invention, all such problems can be reduced, irrespective of the cause thereof, and without having to switch from one formula to another until one has found an infant formula that reduces the presently occurring problem(s) without causing any of the other problem(s) mentioned above.

Usually, when one or more of the above problems occur/persist, a parent will usually switch to another formula or—if that does not help—consult a pediatrician. However, of all infant formulas currently on the market, none has characteristics that can prevent or alleviate all of he above-mentioned problems simultaneously. Thus, the switching to another formula may not reduce the problem and/or may lead to one or more of the other problems mentioned above. Also, the infant may have problems getting used to (the taste of) the new formula, which may lead to a reduction in appetite. The latter may in particular be a problem when—because of the above-mentioned problems—the formula is or has to be changed several times.

In the research leading up to the present invention, it was acknowledged by the inventors that some of the major causes of the disturbance(s) of the processes in the gastrointestinal tract as may occur with conventional infant formulas include:

- the fact that, in the triglycerides present in the (lipid component of) conventional infant formulas, undesirably high amounts of palmitic acid, myristic acid, and/or stearic acid are present in the Sn1- or Sn3- position of glycerol;
- the fact that conventional infant formulas contain undesirably high amounts of divalent cations, and in particular undesirably high amounts of calcium ions. In particular, this is a problem when at the same time, there are high amounts of palmitic acid, myristic acid, and/or stearic acid are present in the Sn1- or Sn3- position of the triglycerides present, i.e. as mentioned above;
- the fact that conventional infant formulas contain insufficient amounts of suitable substrates for microorganisms, i.e. for the naturally occurring intestinal flora.

Thus, according to the invention, these above-mentioned problems are solved by the following measures, which result in an infant formula according to the claims.

SUMMARY OF THE INVENTION

Firstly, an infant formula is provided that—in the lipid/triglyceride components present therein—does not contain high amounts of these saturated fatty acids in the Sn1- or Sn3-position of glycerol, and in particular does not contain high amounts of palmitic acid in the Sn1- or Sn3-position. This can be achieved by using, in the preparation of an infant formula of the invention, a lipid component that:

- contains lipids that have relatively large amounts of C14:0, C16:0 and C18:0 in the Sn2 position of glycerol, such as specific phospholipids or triglycerides of animal, microbial or plant origin, in which the triglycerides have been subjected to enzymatic or other re-esterification such that the palmitic acid residues are for a large part present in the 2-position;
- contains a relatively small amount of fatty acids of the type C14:0, C16:0 and C18:0, especially C16:0.

Secondly, an infant formula is provided that contains a relatively low amount of divalent cations, especially of magnesium and/or calcium, and in particular a low amount of calcium ions, e.g. in the amounts mentioned below.

In conjunction with/in addition to (or even instead of) these low amounts of calcium, according to the invention the bio-availability of said cations may be improved; for instance by assuring that, at pH 6–7 (e.g. under the conditions prevalent in the duodenum), most of the calcium salts provided by the formula of the invention are in the form of water soluble salts (e.g. no or only low amounts of basic phosphate and/or citrate salts).

Also, as mentioned below, preferably the amount of phosphorus in the infant formula should be as low as possible, e.g. as defined below. Inter alia, according to the invention, this is achieved by using proteins, and in particular protein hydrolysates, with a low phosphorus content, as further described below.

In this respect, the use of a protein hydrolysate also ensures that the protein components present in the infant formula of the invention do not sensitise the infants. The use of the hydrolysates also ensures that the protein components can be easily absorbed from the gastrointestinal tract, and thus do not interfere (too much) with the processes occurring in the intestines (and in particular in the colon).

Also, as will be further described below, the use of a protein hydrolysate—in conjunction with the favourable osmotic value provided by the formula of the invention—will promote the natural processes of stomach emptying, which will prevent and/or reduce regurgitation.

Thirdly, an infant formula is provided that contains a sufficient amount of substrate for creation and maintenance of a beneficial flora in the whole gut, especially in the colon. This ensures a uniform production of gas and beneficial substances such as short chain fatty acids, and also prevents the release of excessive amounts of aggressive agents. In human breast milk lactose and oligosaccharides provide this substrate. In conventional infant formula lactose is the only source. It has been found that, most preferably, a source of oligosaccharides is present in the general purpose formula according to the invention, e.g. in addition to or instead of lactose, the latter especially for those infants that are (partly) intolerant to lactose.

DETAILED DESCRIPTION OF THE INVENTION

Thus, the present invention provides an infant formula that comprises any combination of two or more, preferably of three or more, and most preferably all, of the following components:
a) at least one protein component (here below also referred to as "component A");
b) at least one lipid component that can be easily digested by an infant ("component B");
c) at least one prebiotic component ("component C");
at least one viscosity improving component ("component D");
and that optionally further contains any component of infant formula known per se, including but not limited to those described below (here below referred to as "further components"); and in which the components A to D and the one or more further components are preferably as described below.

The protein component may comprise whole proteins and/or a protein hydrolysate, or a mixture thereof, and is most preferably low in phosphorus, e.g. a phosphorus content of less than 0.75 g/100 g protein. Also, when whole proteins are present, they are most preferably such that they are easily digested by the infant, e.g. as described below.

Preferably, the entire infant formula of the invention has a phosphorus content as defined below.

As the source of the protein component preferably mammalian milk, e.g. bovine milk, goats milk or horses milk, is used In particular, an infant formula of the invention may be characterised in that: the protein component a) is a protein hydrolysate, obtained by hydrolysing a starting material comprising a milk protein, a mixture of milk proteins, and/or a milk protein preparation with a combination of at least one endo- and at least one exoproteinase; and may further be characterised in that:
the at least one lipid component b) comprises at least one fatty acid triglyceride and/or a mixture of fatty acid triglycerides, in which:

palmitic acid residues make up more than 10%, up to e.g 30% or higher, preferably 16–24%, of all fatty acid residues present in the triglycerides; and in which, triglycerides in which the palmitate residue is in the Sn1- or Sn3-position make up no more than 16%, more preferably no more than 13, and most preferably no more than 10.7%, of all triglycerides present.

Most preferably, an infant formula of the invention—e.g. containing any two or more, and preferably three or more of the components A to D as mentioned above—is further characterised in that said formula for the most part, and preferably essentially only, contains calcium ions that have a high biological availability, e.g. as described below.

Preferably, the infant formula of the invention is the form of powder, that prior to use is dissolved by the end-user (i.e. the parent) in warm or cold, and preferably luke-warm, water or another suitable liquid carrier, e.g. in an amount of 9–17 g powder per 100 ml water. Both said powder, optionally packaged in a suitable container such as a tin, a box, a bag, a flask or a sachet, as well as the ready-to-use formula obtained by dissolving the powder, form aspects of the invention.

Preferably, the infant formula of the invention contains at least one component A and/or at least one component B in the amount(s) indicated below, i.e. in combination with at least one, preferably at least two, and most preferably all three of the other components [B to D] or [A, C and/or D], respectively; and optionally one or more further components.

More preferably, the infant formula of the invention contains a combination of components A+B+C; and optionally one or more further components.

Generally, in a preferred formula containing at least components A and B, the relative amounts of the above components will be generally as follows:

| | |
|---|---|
| Component A: | 6.4 to 16.0 wt. % |
| Component B: | 18 to 29 wt. % |
| Component C: | 0 to 15 wt. % |
| Component D: | 0 to 15 wt. % |
| Further components: | 0 to 60 wt. % | to a total of 100 wt. % of the final formula (e.g. of the powdered formula).

In a more preferred infant formula containing at least components A, B and C, the relative amounts of the above components will generally be as follows:,

| | |
|---|---|
| Component A: | 6.4 to 16.0 wt. % |
| Component B: | 18 to 29 wt. % |

-continued

| | |
|---|---|
| Component C: | 3.0 to 15 wt. % |
| Component D: | 0 to 15 wt. % |
| Further components: | 0 to 60 wt. % | to a total of 100 wt. % of the final formula.

In the infant formula containing all four components A, B, C and D, the relative amounts of the above components will generally be as follows:,

| | |
|---|---|
| Component A: | 6.4 to 16.0 wt. % |
| Component B: | 18 to 29 wt. % |
| Component C: | 3.0 to 15 wt. % |
| Component D: | 1.5 to 15 wt. % |
| Further components: | 0 to 60 wt. % | to a total of 100 wt. % of the final formula.

It is envisaged that several infant formulas of the invention may be developed, e.g. with different properties, a range of tastes, and/or for different ages of the infant.

It is further envisaged that such formulas may differ as to which of the components A to D and further components are present; which particular compounds/ingredients are used as components A to D and/or as further components; and/or in the (relative) amounts of thereof.

In particular, it is envisaged that there may be developed infant formulas of the invention intended for infants less than 6 months old, as well as infant formulas of the invention intended for infants of more than 4 months old, and in particular more than 6 months old. These will be further discussed below.

The proteins that are preferably used as component A have a relatively low phosphorus content. 100 g protein must provide less than 0.75 g phosphorus, preferably less than 0.72 g and even more preferably less than 0.69 g. Whey proteins, dephosphorylated casein or soy protein and mixtures thereof, as well as specific protein fractions from caseins—such as those from which part of, and preferably most, α-caseins have been removed—are suitable sources The protein hydrolysates that are preferably used is component A form a further and separate aspect of the invention, as does the method for preparing said preferred hydrolysates. It is envisaged that these hydrolysates may find other applications besides their use in the formulas of the invention, as further discussed below.

The preferred protein hydrolysates A—when used in the amounts indicated below—will generally provide the final formula of the invention with one or more—and preferably all—of the following properties:

a peptide profile—i.e. for the proteins derived from the hydrolysate—as described below;

a good taste, and in particular a taste that is not bitter, which is an extremely important characteristic for infant formulas in general, and for the infant formulas of the invention in particular;

a content of free amino acids of less than 10 g, and preferably less than 7 g per 100 g protein equivalent (calculated by multiplying the Kjeldahl nitrogen by 6.25; in which the amount of nitrogen that is measured is determined by the amount of proteins, peptides, amino acids and other nitrogen sources in the product), based upon the final formula;

an osmolality of less than 270 mOsmol/l, preferably less than 240 mOsmol/l, most preferably less than 230 mOsmol/l. Inter alia, an osmotic value in this range will assure that the infant formula of the invention will not disturb (e.g. inhibit) the natural process of stomach emptying in the infant;

low sensibilisation, for instance as determined by the tests described by J. J. Pahud and K. Swartz in *Proc. of the Tropical Conference*, Virginia 1985, AOAC, 264–271; and/or Piacentini et al., *Allergy* 1994, 48, 361–364 or any other suitable test.

In the tests described by Pahud and Swartz or by Piacentini, the infant formula of the invention preferably shows a degree of sensitisation properties that is preferably essentially zero.

Furthermore, according to one preferred aspect, when the infant formula of the invention contains the preferred lipid component B described below, the formula of the invention may have a reduced overall fat content, compared to conventional infant formulas. According to this aspect of the invention, the infant formula of the invention may have an overall fat content (expressed as total lipid content) of less than 46 wt. %; as compared to 48 wt. % or more for conventional infant formulas.

In the formula of the invention, Medium Chain Triglycerides (MCTs) can be used to replace partially triglycerides containing palmitic acid residues. If so, it is preferred that such MCTs are used in an amount of less than 20 wt. % of the total lipid component B.

Also, as further discussed below, when the infant formula of the invention contains the preferred lipid component B, an infant formula of the invention may not require amounts of calcium to be present, that are as high as the calcium contents required in conventional formulas.

In particular, according to this aspect of the invention, an infant formula of the invention for infants of less than 6 months old may have a calcium content (expressed as mg of calcium per 100 kcal of energy content of the formula) of less than 80 mg/100 kcal, and preferably less than 77 mg/100 kcal (e.g. 70 mg/100 kcal); as compared to 82–120 mg/100 kcal for conventional infant formulas. In order to provide sufficient calcium to the infant, the concentration of calcium should be above 50 mg/100 kcal.

An infant formula of the invention for infants of more than 6 months old may have a calcium content (expressed as mg of calcium per 100 kcal of energy content of the formula) of less than 122 mg/100 kcal, and preferably less than 116 mg/100 kcal (for example 110 mg/100 kcal); as compared to 125 mg/100 kcal or more for conventional infant formulas.

Such a reduced calcium content may have certain advantages, such as decreased formation of fatty acid soaps in the gut and more natural exposure of calcium ions to the enterocytes in the duodenum and other parts of the gut and to the gut flora. In addition it was found that less technological problems related to sedimentation occurred, e.g. during the preparation of the formula.

Calcium is preferably added to the infant formula of the invention as soluble salt(s), such as the hydroxide or chloride salts. Tribasic phosphate and citrate salts are insoluble. In addition, it is aimed to prevent that during manufacture insoluble calcium salts are formed, such as phosphates and/or citrates.

Also, as in infant formula the amount of phosphorus present generally depends upon the calcium content, in that in conventional infant formula the ratio of calcium-to-phosphorus is generally between 1.5 and 2.0, and usually about 2, the infant formula of the invention may also have a reduced phosphorus content.

For instance, based upon the calcium contents mentioned above and a general calcium-to-phosphorus ratio about 2, an infant formula of the invention for infants of less than 6 months old may have a phosphorus content (expressed as mg of phosphorus per 100 kcal of energy content of the formula) of less than 40 mg/100 kcal, and preferably less than 38,5 mg/100 kcal (e.g. 38 mg/100 kcal); whereas an infant formula of the invention for infants of more than 6 months old may have a phosphorus content (expressed as mg of phosphorus per 100 kcal of energy content of the formula) of less than 61 mg/100 kcal, and preferably less than 58 mg/100 kcal (e.g. 38 mg/100 kcal).

Such a reduced phosphorus content may have certain advantages, such as less sedimentation during manufacture and increased bioavailability of divalent cations.

When besides the phosphorus provided by proteins and/or phospholipids extra phosphorus has to be added, this is especially done by adding monobasic phosphates, preferably from sodium and/or potassium.

Alternatively, when an infant formula of the invention has a reduced calcium content as described above, the formula of the invention may be prepared at reduced calcium-to-phosphorus ratio of between 1.4 and 2. Such a reduced calcium-to-phosphorus ratio may also have certain advantages, such as to compensate for certain properties of the water that is used by the final user to prepare the formula, e.g. by dissolving the powdered formula of the invention.

Also, when one or more prebiotic components C are present in the infant formula of the invention, the content thereof is preferably at least 0.3 g/100 ml of the total formula, more preferably at least 0.6 g/100 ml of the total formula. When the formula is given to infants in the usual amounts—e.g. of at least about 200 ml per day (mainly depending upon the age of the infant) as one or more, and preferably 4 or more, feedings per day—this will correspond to a total daily dose of prebiotic components of at least 1.8 g/day (again mainly depending upon the age of the infant).

Furthermore, when one or more viscosity improving components D are present, the viscosity of the final formula is preferably between 20 and 100 cps, more preferably between 40 and 80 cps; as measured in a Brookfield viscosimeter at 30 rpm.

Also, the infant formula of the invention preferably has a pH in the range of 4.0 to 7.5.

Furthermore, according to one specific embodiment of the invention, the infant formula of the invention may (also) have a low lactose content, in order to prevent and/or reduce the problems associated with (partial) lactose intolerance and/or reduced lactase activity in the colon. In this embodiment, the infant formula of the invention contains any combination of at least two, preferably at least three, and most preferably all four components A to D; and has a lactose content of at most 6.0 g/100 ml, preferably less than 4.5 g/100 ml, more preferably less than 3.0 g/100 ml of the total formula, as determined by an assay for lactose content known per se.

Such a formula may be of importance for infants that are lactose intolerant and/or that are suspected to be lactose intolerant, e.g. because they are premature and/or because they (may) have a low lactase activity, e.g. due to hereditary factors.

The infant formula of the invention may generally be prepared by mixing/combining the different components/ingredients in the amounts mentioned herein. This may generally be carried out in a manner known per se using well known mixing and/or processing equipment. The infant formula may also be heated/sterilised (e.g. by UHT-treatment) and is then preferably brought into a powder form, e.g. by evaporation or (spray-)drying; and aseptically packaged, e.g. in a suitable container such as a tin, a box, a bag, a flask or a sachet. A preferred method for preparing the infant formula of the invention, starting from the preferred hydrolysates used in the invention, will be discussed in more detail below.

The components A to D and any further components to be used in the invention will now be further discussed below. In this respect, it will be clear to the skilled person that any component or ingredient used in the infant formula of the invention should be acceptable for use in food products, and in particular be acceptable for use in infant formulas. Also, any component(s) or ingredients used should preferably be compatible with the other components/ingredients of the final formula, and more preferably should also not detract (too much) from the desired properties of the final formula, including but not limited to those provided by any of the other components/ingredients.

I: Component A:

Component A comprises intact proteins, a protein hydrolysate, or a combination thereof.

Component A is preferably such that it has a low phosphorus content and is preferably also such that it is easily digestible. Also, preferably, this protein source provides all amino acids that are required for optimal growth, and in sufficient amounts. Suitable sources include specific fragments of proteins from mammal milk or low-phosphorus protein from plant origin such as soy. Most preferably, for infants that could be intolerant to intact proteins, the proteins must be hydrolysed.

Preferably, this is a hydrolysate obtained by the hydrolysis of one or more milk proteins, in particular from cow's milk, including but not limited to proteins, protein fractions and/or protein preparations derived from whole milk, skimmed milk, casein and/or whey.

In principle, any milk protein hydrolysate known per se that is suitable for use in food products, more in particular that is suitable for use in infant formula, may be used; and such protein hydrolysates are well known in the art.

Preferably, the protein hydrolysate used has one or more, and preferably all, of the characteristics a) to e) described below. In this respect, although it is not excluded that some prior art methods may afford a protein hydrolysate that has one or more of the desired characteristics a) to e)—and such hydrolysates may be used in the infant formula of the invention—the present invention also provides a range of preferred protein hydrolysates, as well as a method for preparing such hydrolysates, which simultaneously show all desired characteristics a)–e). The use of these hydrolysates is particularly preferred.

In particular, a protein hydrolysate used in the invention should have one or more of the following characteristics:

a) the hydrolysate should contain all amino acids necessary for good growth of the infant;
b) at least 50% by weight of the peptides present in the hydrolysate (based upon all protein components present in the mixture, including any free amino acids) should have a chain length of between 2 and 30 amino acids, preferably of between 2 and 15 amino acids, and more preferably of between 3 and 12 amino acids; the remainder being either protein components with more amino acids in the protein chain, and/or free amino acids. Preferably, of these remaining protein components, between 0.5 to 8%, more preferably between 0.7 to 7%, and even more preferably between 0.75 and 5%, will have a chain length of more than 30 amino acids. The presence of small oligopeptides improves the digestibility of the proteins, and thereby of the entire formula. Also, the presence of oligopeptides of between 15 and 30 amino acids will allow the digestive system of the infant to get used to larger and/or intact peptides;

c) a low osmolality, due to a low content of free amino acids and salts. This prevents disturbances of the gastrointestinal tract/digestive system such as diarrhoea, or at least (further) reduces the risk thereof and prevents a low rate of emptying of the stomach. In this respect, it should be noted that, as the infant formula of the invention is in particular intended for infants that have problems adapting to food/infant formula—e.g. that suffer from one or more of the problems mentioned above—it is important that the present formulas may have a high protein content, if desired. This makes controlling the osmolality of the hydrolysate used in preparing the infant formula of the invention all the more important.

Also, as mentioned above, a low content of free amino acids is of importance as such free amino acids may provide the hydrolysate—and thereby the entire formula—with a bitter taste. For masking this bitter taste, sweeteners would need to be added to the formula, in particular sweeteners containing many free sugars such as a glucose syrup or certain hydrolysates of starch (e.g. of maize or pea ) These, however, generally have a high osmolality (such as starch hydrolysates having a DE value of>35), which in turn would increase (too much) the osmolality of the final formula.

Thus, it is another object of the invention to provide a protein hydrolysate-based infant formula that can contain less sweeteners and/or sweeteners with a low osmolality (e.g. with a DE value of less than 30). Preferably, as mentioned above, the osmolality of the hydrolysate is such that—when the hydrolysate is incorporated in the infant formula in the amounts indicated herein—the osmolality of the final formula is less than 270 mOsmol/l, preferably less than 240 mOsmol/l, most preferably less than 230 mOsmol/l;

d) a good taste, and in particular a taste that is not bitter, which is an extremely important characteristic for (protein hydrolysates for use in) infant formulas.

The taste, and in particular the bitterness, of a protein hydrolysate may for instance be determined in a comparative test involving a taste panel and the use of a suitable compound such as caffeine or a standard hydrolysate as a reference.

In particular, in the taste panel test described in Example 2 of U.S. Pat. No. 5,837,312 using a 5% solution of the compound to be tested and using caffeine as the reference, any hydrolysate to be used in the infant formula of the invention should preferably have a bitter taste of less than 2.7; preferably less than 2.4, most preferably between 1.6 and 2.3 (on a scale from 1 to 6 with 6 being the value for the reference caffeine).

As is known in the art, the bitter taste of protein hydrolysates is (at least in part) due to the presence of free amino acids that are formed during hydrolysis, such as free phenylalanine and/or tyrosine ). Thus, in the hydrolysates to be used in the invention, the amount of such free amino acids should be as low as possible, i.e. no more than 10 wt. %, and preferably no more than 7 wt.% of all protein components (including the free amino acids).

e) a rate of low sensibilisation, for instance as determined by the tests described by J. J. Pahud and K. Swartz in *Proc. of the Tropical Conference*, Virginia 1985, AOAC, 264–271; and/or Piacentini at al., *Allergy* 1994, 48, 361–364 or any other suitable test. In particular, the hydrolysate is such that—when the hydrolysate is incorporated in the infant formula in the amounts indicated herein—the final infant formula of the invention preferably shows a degree of sensibilisation in the tests described by Pahud and Swartz or by Piacentini, of essentially zero.

As is known in the art, the allergenic properties of a hydrolysate—and thereby of the infant formula in which it is incorporated—is for a large part dependant upon the kinds and amounts of peptides that are formed during/that remain after hydrolysis. In this respect, the use of a protein hydrolysate prepared as described below is particularly advantageous.

Although imbalances in the osmolality of the protein hydrolysate can be corrected by removal of ions via techniques that are known in the art, it is highly desirable that hydrolysates fulfil all characteristics a) to e) mentioned above. Such a hydrolysate can be prepared in a reliable manner via the method described below. Preferably, the hydrolysate is present in the infant formula of the invention in an amount between 1 and 3 g/100 ml, more preferably between 1.3 and 2.0 g/100 ml, and most preferably between 1.6 and 1.9 g/100 ml of the total formula.

II: Method for Preparing the Preferred Protein Hydrolysates Suitable for use as Component A in the Invention, and use of Said Hydrolysate in Preparing the Infant Formula of the Invention:

As mentioned above, this method as well as the hydrolysates obtained by it form separate aspects of the invention.

As the starting material for the hydrolysis of the invention, any protein, mixture of proteins or protein preparation that has a phosphorus content of less than 0.75 g/100 g protein can be used. The use of proteins from mammal milk, in particular bovine milk such as whey, in particular acid whey; dephosphorylised casein; β-casein or a suitable mixture thereof is particularly preferred.

Most preferably, the protein starting material has a phosphorus content of less than 0.72 g P/100 g protein, most preferably less than 0.69 g P/100 g protein. Again, these staring materials will include whey, in particular acid whey; dephosphorylised casein; or specific casein fractions with reduced α-casein content and/or increased β-casein content.

Optionally, the starting material may be treated to remove any (remaining) native enzymatic activity.

Also, optionally, a suspension of yeast cells, optionally homogenised and heated and/or pre-treated to crush the cell walls, may be added to the starting material prior to use in the hydrolysis of the invention, e.g. in an amount of 1–8 g dry mass of yeast cells per 100 g protein. For instance, a mixture of acid whey containing 4% yeast protein (for instance added as a suspension of 10% baker's yeast) may be used.

The starting material—as such or in a suitable form such as a solution or suspension—is then treated with a combination of at least one endo- and at least one exoproteinase, in which said enzyme mixture is added in an amount of 0.1–5%, based on the starting material.

The endo- and exoproteinases can be used sequentially—e.g. in two or more separate hydrolysis steps—or simultaneously, e.g. as a suitable mixture in a single hydrolysis step, optionally in combination with one or more further hydrolysis steps using any remaining enzymes. Preferably, the hydrolysis comprises a single hydrolysis step using a combination of all enzymes to be used.

Preferably, as the endo- and exoproteinases, a suitable mixture of serine proteases is used, including but not limited to a suitable enzyme mixture containing (at east) the enzymes Alcalase®, an enzyme produced by *Bacillus lic eniformis* and trypsin (both available from Novo Nordisk) Another enzyme suitable for use in said enzyme mixture is Flavourzyme®, an enzyme mixture produced by a train of *Aspergillus oryzae* and contains several enzymes, both endo-proteases and exo-peptidases (also available from Nov Nordisk). Particularly preferred is the use of a mixture of Alcalase®, Flavourzyme® and trypsin in relative amounts of about 5–10 parts Alcalase to 3–5 parts Flavourzyme to 1 part trypsin (such as for instance a 7,5:4:1 mixture), which mixture is most preferably used in an amount corresponding to at least 0.1%—e.g. about 0.2%—trypsin per 100 g of starting protein.

By using such a preferred mixture in the manner described below, a hydrolysate can be obtained that, despite the presence of relatively high molecular weight peptides/proteins, is non-sensibilising. Applying the conditions as described above allows the preparation of an infant formula of a not-bitter taste and a low osmolality (e.g. as described above).

Using a mixture of endo- and exoproteinase—and in particular of the preferred mixture of Alcalase®, Flavourzyme® and trypsin—the starting material is hydrolysed at a temperature of about 45–60 ° C., preferably between 50 nd 58° C. for less than 4 hours, preferably from 1.5 to 3 hour . During the hydrolysis, the pH is kept in the range of 6 4 to 8, and preferably kept essentially constant, e.g. in the of 6.8 to 7.8

Generally, the degree of hydrolysis is not critical. In other words, independent upon the final degree of hydrolysis, hydrolysis of the above starting materials using the enzyme combination(s) under the aforementioned conditions and for the above period of time will generally result in a hydrolysate having the desired properties for use in the infant formula of the invention. Optionally, if necessary, the skilled person will be able—on the basis of the disclosure herein—to adapt the above hydrolysis conditions such that a hydrolysate with the desired properties is obtained.

Also, it should be noted that generally—and apart from the use of the above starting materials and preferred enzyme combination(s)—the hydrolysis conditions may not be too critical, dependant upon the manner in which the hydrolysate is (further) processed prior to use in the infant formula of the invention. However, it has been found that the desired characteristics a) to e) of the final infant formula are best and most reliably obtained when the above conditions are used in combination with the cooling step that will now be described.

The hydrolysis reaction may be terminated in any suitable manner. However, in order to ensure the combination of desired characteristics a) to e) in the final hydrolysate, it is most preferred that the hydrolysis reaction is not terminated/quenched by heating (as is usual), but instead by cooling the hydrolysis mixture, e.g. without specifically removing or denaturating the enzymatic activities present in the mixture.

In particular, according to the invention, the total reaction mixture is cooled within one hour from the hydrolysis temperature—e.g. about 45–60° C., preferably between 50 and 58° C.—to a temperature of less than 20° C., preferably less than 10° C. Said cooling is preferably started between 1.5 to 3 hours after initiation of the hydrolysis reaction.

Thus, a suitable temperature protocol for the hydrolysis may be as follows:

| | |
|---|---|
| hydrolysis (45–60° C., pref. 50–58° C.): | 1.5 to 4 hours |
| cooling (to <20° C., pref. <10° C.): | 10 min. to 1 hour |
| total time: | 1.7 to 4.5 hours | with the preferred temperature protocol for the hydrolysis being as follows:

| | |
|---|---|
| hydrolysis (45–60° C., pref. 50–58° C.): | 2.0 to 3.0 hours |
| cooling (to <20° C., pref. <10° C.): | 10 minutes to 1 hour |
| total time: | 2.2 to 3.5 hours. |

The cooled hydrolysate thus obtained may then be used as such in the preparation of the infant formula of the invention, or after suitable processing, such as removing one or more undesired compounds or components, including but not limited to salts, amino acids, the enzymes used in the hydrolysis.

This may for instance be carried out by desalting (e.g. by dialysis); by precipitation, i.e. through acidification with a food grade acid such as hydrochloric acid to a pH<5.0, followed by removing of the precipitate (e.g. by centrifugation) and re-adjusting the pH to a suitable value, for example between 6 and 7; or by any other suitable technique.

Also, instead of the entire hydrolysate, only a fraction thereof may be used, for instance obtained by removing (part of) the proteins with a chain length of more than 30 amino acids.

The hydrolysate thus obtained is then incorporated into the infant formula of the invention, e.g. by the following non-limiting processing steps, which are preferably carried out within 24 hours, more preferably within 8 hours, of the end of the hydrolysis reaction:

a) All further ingredients of the final formula—e.g. the lipid component(s) B; the prebiotic component(s) C (if any); optionally a part of the viscosity improver(s) D (if any); and the optional further components, such as the vitamins, minerals and trace elements—are added to the hydrolysate.

The mixture is then homogenised and heated, in order to obtain the desired microbiological quality of the product, without detracting (too much) from the desired characteristics of the formula and/or the desired biological activity of the components incorporated therein. For instance, a UHT treatment at 140° C. during about 2.4 seconds may be used. The product is then brought into a powder form—e.g. by evaporation and (spray-) drying. It is preferred that some of the ingredients such as the viscosity improving agents D—if present—are added to the powder after spray-drying. Then, the final composition can be aseptically packaged, e.g. in a suitable container such as a tin, a box, a bag, a flask or a sachet.

b) Alternatively, after adding the water-soluble components to be incorporated into the final formula—such as the vitamins, minerals and trace elements—the hydrolysate may be heated and partially dried/evaporated, upon which the lipid component(s) B and any remaining components are added. The mixture may then be homogenised and brought into powder form. After optionally adding further powdered ingredients such as viscosity-improving agents, the final composition is packaged, i.e. as described above.

An infant formula prepared in this manner—i.e. via the aforementioned method starting from the preferred hydrolysate—has optimum characteristics with respect to taste, low osmolality, low content of free amino acids, reduced sensibilising characteristics, and a protein/amino acid content that is particularly suited for infant formula.

Also, in the method described above, the hydrolysate is subjected to only a minimal heat treatment, which ensures that the biological activity of the components present in the formula is maintained, or at least not significantly detracted.

Furthermore, the above method reliably leads to a hydrolysate and/or infant formula with the desired characteristics, which is safe and is cost-efficiently produced (limited use of expensive enzymes such as trypsin and low production costs).

Thus, in further aspects, the invention relates to a hydrolysate obtained via the method described in this Section II; to an infant formula comprising such a protein hydrolysate; and to the use of such a protein hydrolysate in the preparation of an infant formula, in particular to the use as component A in the preparation of an infant formula of the invention.

As above, the preferred hydrolysate is preferably present in the infant formula of the invention in an amount between 1 and 3 g/100 ml, more preferably between 1.3 and 2.0 g/100 ml, and most preferably between 1.6 and 1.9 g/100 ml of the total formula.

However, besides their use in the invention, it is envisaged that the method described in this Section II—as well as the hydrolysates obtained via said method—may find other applications, in particular in the field of food products, more in particular in the fields of infant foods and/or dietary foods, e.g. for the prevention or treatment of food allergies, and the manufacture of foods that are intended to rapidly pass the stomach and are easily digested. The latter products can be very useful for patients suffering from an impaired stomach function, an impaired liver function, an impaired pancreas function and/or an impaired gut function.

Thus, as already mentioned, the method of this Section II as well as the hydrolysates obtained by it, form independent and separate aspects of the present invention.

III: Component B:

The at least one lipid component B—i.e. the one or more fats and/or fatty acid component(s) present in the infant formula of the invention—may be chosen from all fatty acid triglycerides known per se for use in food products, and are preferably chosen from all the fatty acid triglycerides and/or phospholipids (and/or mixtures thereof) known per se for use in infant foods, and in particular from those known per se for use in infant formulas.

As is known from the art, such fatty acid triglycerides generally comprise a glyceride molecule to which are attached, via ester bonds, three fatty acid residues, which may be the same or different, and which are generally chosen from saturated and unsaturated fatty acids containing 6 to 26 carbon atoms, including but not limited to linoleic acid, α-linolenic acid, oleic acid, palmitic acid ($C_{16}$) and/or stearic acid ($C_{18}$).

Such fatty acid triglycerides may differ in the fatty acid residues that are present and/or in the respective position(s) of the fatty acid residues (e.g. in the 1-, 2- and/or 3-position). Usually, as is known in the art, a lipid component for use in infant formula will comprise a suitable mixture of two or more, and usually a several, different fatty acid triglycerides, depending upon for instance the desired properties of the lipid component, the source of the fat, as well as the way in which the fat was obtained.

The at least one lipid component B—i.e. the one or more fatty acid triglycerides present therein—are preferably chosen such that the lipid component B is easily digestible by the infant, thereby (also) making the final formula easily digestible. This improves the structure of the faeces and improves the biological availability of divalent cations such as calcium and/or the fats/fatty acids present in the formula.

In this respect, the amount and position of the palmitic acid residues that are present in the triglycerides that are present in/make up the at least one lipid component B are of special significance. Preferably, palmitic acid residues should make up more than 10%, preferably 16–24%, of all fatty acid residues present in the triglycerides used as or in component B.

Also, the amount of triglycerides in which the $C_{14}$:0, $C_{16}$:0 and/or $C_{18}$:0 fatty acids are in the Sn1- or Sn3-position and in particular in which the palmitate residues are in the Sn1 or Sn3-position should be as low as possible. The amount of palmitic acid in the Sn1 or Sn3-position should preferably make up no more than 16%, more preferably no more than 13%, and most preferably no more 10.7%, of all triglycerides present. This corresponds to amounts of triglycerides with the palmitate residue in the Sn1- or Sn3-position of less than 0.55 g/100 ml, preferably less than 0.50 g/100 ml, most preferably less than 0.38 g/100 ml of the infant formula of the invention.

In other—but somewhat less restrictive—words, when the palmitic acid residues make up more than 10%, preferably 16–24% of all fatty acid residues present in the triglycerides used in or as component B of the invention, of these palmitic acid residues, as much as possible, and preferably at least 30%, more preferably at least 40%, should be in the 2- or β-position of the triglyceride.

Mixtures of fatty acid triglycerides that contain more than 10%, preferably 16–24% palmitate residues and that meet one or both of the requirements relating to the position of the palmitate residues set out in the above two paragraphs, will also be referred to below as the "preferred lipid component B". For instance, these include specific phospholipids as well as so-called structured fats, e.g. fats of animal or plant origin, in which the triglycerides have been subjected to enzymatic or other re-esterification such that the palmitic acid residues are for a large part present in the 2-position.

Such preferred components B are commercially available—e.g. from Loders Croklaan under the name Betapol® (beta palmitate)—and/or can be prepared in a manner known per se., for instance as described in EP 0 698 078 and/or EP 0 758 846.

However, because of the better absorption of these fat mixtures from the infant gut, the use of a preferred lipid component B as described above may allow the amount of component B that is added to the infant formula of the invention to be reduced, while still providing sufficient energy/nutritional value to the infant.

In particular, by using a preferred lipid component B, the overall fat content of the infant formula of the invention may be reduced from 48 wt. % or more for conventional infant formulas to less than 46 wt. % in an infant formula of the invention.

Also, the use of a preferred lipid component B may allow the overall calcium content of the infant formula of the invention to be lowered, i.e. as set out above. Such a reduction in the calcium content may in turn allow the overall phosphorus content of the infant formula of the invention to be lowered, again as set out above.

Alternatively, the use of a preferred lipid component B may allow the calcium-to-phosphorus ratio of the infant formula of the invention to be lowered, e.g. from about 2 for conventional formulas to a range of about 2.0 to 1.4.

Finally, although component B has been described above as essentially only consisting of fatty acid triglycerides, it should be understood that the presence of minor amounts of mono- or diglycerides (e.g. to a total of at most one-third of all fatty acids of all fatty acid mono-, di- and triglycerides present in or as component B, the remainder being fatty acid triglycerides to a total of 100% of component B) is not excluded. Such mono- or diglycerides will usually contain the fatty acid residues referred to above.

IV: Component C:

The one or more prebiotic components C may be chosen from all prebiotic components known per se for use in food products, and are preferably chosen from the prebiotic components known per se for use in infant foods, and in particular from those known per se for use in infant formulas.

Some preferred but non-limiting examples thereof include prebiotic (non-digestible) oligosaccharides. Generally, these will be hydrolysed or non-hydrolysed carbohydrates comprising sugar residues interconnected via beta 1-1, 1-2, 1-3, 1-4, 1-6 and/or alpha 1-6 linkages. Most preferably, such oligosaccharides will contain 2–20 sugar residues in the saccharide backbone.

For instance, such prebiotic oligosaccharides include, but are not limited to, lacto-N-tetraose, lacto-N-fucopentaose, lactulose, lactosucrose, raffinose, galacto-oligosaccharides, fructo-oligosaccharides, oligosaccharides derived from soybean polysaccharides, mannose-based oligosaccharides, arabino-oligosaccharides, xylo-oligosaccharides, isomalto-oligo-saccharides, glucans, sialyl oligosaccharides, fuco-oligosaccharides, and/or any suitable combination thereof.

Also, lactose may be used as the prebiotic. However, the use of lactose in the infant formula of the invention should be avoided when a formula with low lactose content is desired, e.g. a formula for infants that are, or are suspected to be, lactose intolerant (e.g. based on age or hereditary factors).

The use of one or more trans-galacto-oligosaccharides ("TOS"), one or more fructo-oligosaccharides ("FOS") and/or mixtures thereof is particularly preferred, in particular the use of mixtures of one or more trans-galacto-oligosaccharides and one or more fructo-oligosaccharides in which the ratio of TOS-to-FOS is between 5:1 and 15:1, and more in particular about 9:1, which mixtures generally provide a prebiotic effect comparable to mothers milk.

The amount of the one or more prebiotic components C used will generally depend upon the specific prebiotic component(s) used, as well as on the amount of formula to be fed to the infant per day, e.g. as one or more, and preferably four or more, feedings per day. Generally, the amount of prebiotic component(s) C will be such that—when the formula is fed to the infant in the amount recommended/prescribed—it is sufficient to provide a daily dose of prebiotic component(s) of at least 1.8 g/day for infants of less than 4 months old; and preferably at least 3.6 g/day for infants of more than 4 months old. Normally, an infant will be fed a total of between 500 and 800 ml of the formula of the invention per day. Thus, the above amounts correspond to an amount of component(s) C at least 0.3 g/100 ml of the total formula, more preferably at least 0.6 g/100 ml of the total formula.

The use of the above prebiotics in the infant formula of the invention may (help to) restore the natural gastrointestinal flora and/or will result in a reduction of aggressive components in the faeces, e.g. of components that may irritate or harm epithelial cells (such as those of the lining of the gastrointestinal tract and/or the skin). The latter is of extreme importance for infants suffering from diaper rash.

V: Component D:

The one or more viscosity improving components D may be chosen from all viscosity improving components known per se for use in food products, and are preferably chosen from the viscosity improving components known for use in infant foods, especially from those known per se for use in for infant formulas; see for example EP 0 846 422.

Some preferred but non-limiting examples thereof include viscosity improving components based upon carbohydrates, and in particular those based upon starches and/or starch derivatives such as pregelatinised starches, such as pregelatinised potato starch, which is preferred.

The amount of the one or more viscosity improving component(s) D used will generally depend upon the specific viscosity improving component(s) used and on the other components present in the formula, and will generally be such that the viscosity of the final formula is between 20 and 100 cps, preferably between 40 and 80 cps; as measured in a Brookfield viscosimeter at 30 rpm. Usually, the total amount of viscosity improving component(s) D will be between 0.5 and 5 g/100 ml of the formula, preferably between 1 and 3 g/100 ml. For instance, pregelatinised potato starch may be used in an amount of between 1.4 and 2.1 g/100 ml.

The use of the viscosity improving component(s) D may provide several advantages, including but not limited to prevention or reduction of regurgitation and/or excessive aerophagia (burps).

VI: Further components:

Besides the above-mentioned components A to D, the composition of the invention may further contain any component or ingredient for infant formula known per se, in usual amounts (e.g. as prescribed by national or international guidelines) and depending upon (the properties of) the final formula desired. Such further components may include, but are not limited to, one or any combination of the following:

one or more of the following compounds: taurine, choline, carnitine, inositol, biotin;

one or more polyunsaturated long chain fatty acids ("PUFAs"), including but not limited to linoleic acid, α-linolenic acid, oleic acid, arachidonic acid and docosahexaenoic acid.

one or more nucleotides and/or nucleotide analogues;

one or more (added) amino acids, including but not limited to tryptophan and/or methionine;

one or more (added) vitamins, including but not limited to vitamin K, vitamin B1, vitamin B2, vitamin A, vitamin E, vitamin D, vitamin C, niacin, pantothenic acid. Also, besides the usual amounts of these or other vitamins, the infant formula of the invention may contain additional amounts of—for instance—folic acid, vitamin B12 and/or vitamin B6;

one or more minerals and/or trace elements;

one or more preservatives (not preferred);

one or more flavors and/or colourings.

EXAMPLES

Example 1

Formula for Infants of More than 4 Months Old

An infant formula for infants of more than 4 months old is prepared essentially as described under II. above. The formula has the following composition, an energy/nutritional value of 72 kcal/ml and an osmolality of 260 mOsmol/l. The calcium content is 86 mg/100 kcal and the phosphorus content is 54 mg/100 kcal.

| Component | g per 100 g powder | g per 100 ml* |
|---|---|---|
| Protein equivalents | 12.4 | 1.9 |
| Whey-protein hydrolysate** | | 1.9 |
| Carbohydrates | 54.8 | 8.6 |
| Saccharides (lactose) | | 4.0 (2.7) |
| Polysaccharides from maltodextrins | | 2.0 |
| Polysaccharides from potato starch | | 2.3 |
| Organic acids | | 0.1 |
| Fat | 21.1 | 3.3 (=41 wt. %) |
| Saturated | | 1.4 |
| Beta palmitate (Loders Croklaan) | | 0.23 |
| Mono-unsaturated | | 1.4 |
| Poly-unsaturated | | 0.54 |
| Fibre/non-digestible oligosaccharides | 5.0 | 0.78 |
| TOS | | 0.7 |
| FOS | | 0.08 |
| Further components: | | |
| Minerals, trace elements and vitamins in amounts as recommended by the EEC regulation 321. | | |

Notes:
*obtained by dissolving 15.6 g powder in 100 ml water.
**preferred protein hydrolysate A as described under II. above.

Example 2

Formula for Infants of up to 6 Months Old

An infant formula for infants of up to 6 months old is prepared essentially as described under II. above. The formula has the following composition, an energy/nutritional value of 70 kcal/ml and an osmolality of 240 mOsmol/l. The calcium content is 53 mg/100 kcal and the phosphorus content is 27 mg/100 kcal.

| Component | g per 100 g powder | g per 100 ml* |
|---|---|---|
| Protein equivalents | 11.6 | 1.7 |
| Whey-protein hydrolysate** | | 1.7 |
| Carbohydrates | 55.4 | 8.3 |
| Saccharides (lactose) | | 4.0 (2.9) |
| Polysaccharides from maltodextrins | | 1.5 |
| Polysaccharides from potato starch | | 1.8 |
| Fat | 21.1 | 3.3 (=42 wt. %) |
| Saturated | | 1.4 |
| Beta palmitate | | 0.23 |
| Mono-unsaturated | | 1.4 |
| Poly-unsaturated | | 0.54 |
| Fibre/non-digestible oligosaccharides | 5.0 | 0.78 |
| TOS | | 0.7 |
| FOS | | 0.08 |
| Further components: | | |
| Minerals, trace elements and vitamins in amounts as recommended by the EEC regulation 321. | | |

Notes:
*obtained by dissolving 15.0 g powder in 100 ml water.
**preferred protein hydrolysate A as described under II. above.

Example 3

Formula for Infants of up to 4 Months Old

An infant formula for infants of up to 4 months old is prepared essentially as described under II. above. The formula has the following composition, an energy/nutritional value of 67 kcal/ml and an osmolality of 230 mOsmol/l. The calcium content is 45 mg/100 kcal and the phosphorus content is 25 mg/100 kcal.

| Component | g per 100 g powder | g per 100 ml* |
|---|---|---|
| Protein equivalents | 10.5 | 1.54 |
| Hydrolysed whey** | | 1.46 |
| From L-tryptophan | | 0.01 |
| From L-methionine | | 0.01 |
| From hydrolysed baker's yeast** | | 0.06 |
| Carbohydrates | 55.4 | 8.3 |
| Saccharides (lactose) | | 3.5 |
| Polysaccharides from maltodextrins | | 3.3 |
| Polysaccharides from potato starch | | 1.4 |
| Fat | 19.2 | 3.0 (=40 wt. %) |
| Saturated | | 1.2 |
| Beta palmitate | | 0.23 |
| Mono-unsaturated | | 1.3 |
| Poly-unsaturated | | 0.5 |
| Fibre/non-digestible oligosaccharides | 3.2 | 0.5 |
| TOS | | 0.37 |
| FOS | | 0.03 |
| Lacto-N-tetraose | | 0.10 |
| Further components: | | |
| Folic acid (µg) | | 20 |
| Vitamin K (µg) | | 10 |
| Minerals, trace elements and vitamins: in amounts as recommended by the EEC regulation 321. | | |

Notes:
*obtained by dissolving 15.0 g powder in 100 ml water.
**preferred protein hydrolysate A as described under II. above.

Example 4

Formula for Infants of up to 4 Months Old

An infant formula for infants of up to 4 months old is prepared essentially as described under II. above. The formula has the following composition, an energy/nutritional value of 68 kcal/100 ml and an osmolality of 260 mOsmol/l. The calcium content is 40 mg/100 kcal and the phosphorus content is 20 mg/100 kcal.

| Component | g per 100 ml* |
|---|---|
| Protein equivalents | 1.30 |
| Hydrolysed β-casein/whey (40/60) | 1.29 |
| From L-tryptophan | 0.01 |
| Carbohydrates | 8.5 |
| Lactose | 5.5 |
| Polysaccharides | 2.8 |
| Lipids | 3.2 |
| Saturated | 1.5 |
| From β-palmitate | 0.2 |
| From MCT's + coconut oil | 1.1 |
| Mono-unsaturated | 1.2 |
| Poly-unsaturated | 0.5 |
| Fibre/non-digestible oligosaccharides | 0.5 g |
| Arabino oligosaccharides | 0.4 |
| FOS | 0.1 |
| Further components: | |
| Minerals, trace elements and vitamins: in amounts as recommended by the EEC regulation 321. | |

Notes
*obtained by dissolving 14.5 g powder in 100 ml water.

Example 5

Comparative Study

The effects of the formula of example 2 was tested in a study involving 51 term infants and were compared to the effects of a standard commercial product not containing beta palmitate and no adapted calcium to phosphorus ratio. After prolonged feeding of the formulae, significantly less problem with constipation (p<0.05), abdominal discomfort (p<0.005) and minor gastrointestinal problems (p<0.01), as well as less problems associated with gastrointestinal discomfort (cramps and crying) were observed with the formula of the invention compared to the standard formula.

What is claimed is:

1. An infant formula comprising:
   a) a protein component having a phosphorous content of less than 0.75 P100 g protein; and
   b) a lipid component that can be digested by an infant, comprising fatty acid triglycerides in which palmitic acid residues make up more than 10% of all fatty acid residues present in the triglycerides, and wherein palmitic acid residues in the Sn1 or Sn3 position make up more then 16% of all triglycerides present.

2. The infant formula according to claim 1, in which the protein component a) has a phosphorus content of less than 0.72 g P/100 g protein, more preferably less than 0.69 g P/100 g protein.

3. The infant formula according to claim 1, in which the at least one protein component a) is a hydrolysate obtained by hydrolyzing a starting material comprising proteins from mammalian milk or a dephosphorylated protein from plant origin with a combination of at least one endo- and at least one exoproteinase.

4. The infant formula according to claim 3, in which the hydrolysate used as component a) is obtained by hydrolysing a starting material comprising a milk protein, a mixture of milk proteins and/or a milk protein preparation with a combination of at least one endo- and at least one exoproteinase.

5. The infant formula according to claim 1, further comprising at least one of: c) at least one prebiotic component, selected from lacto N-tetraose, lacto-N-fuco-pentaose, lactulose, lactosucrose, raffinose, galacto-oligosaccharides, fructo-oligo-saccharides, oligosaccharides derived from soybean polysaccharides, mannose-based oligosaccharides, arabino-oligosaccharides, xylo-oligosaccharides, isomalto-oligo-saccharides, glucas, sialyl oligosaccharides and fuco-oligosaccharides; and d) at least one viscosity-improving component.

6. The infant formula according to claim 1, characterised by a content of free amino acids, derived from the protein hydrolysate a), of less than 10 g per 100 g protein equivalent.

7. The infant formula according to claim 1, characterised by an osmolality of less than 270 mOsmol/l.

8. The infant formula according to claim 1, intended for infants of less than 6 months old, characterised by a calcium content, expressed as mg of calcium per 100 kcal of energy content of the formula, of less than 80 g/100 kcal.

9. The infant formula according to claim 1, intended for infants of more than 6 months old, characterised by a calcium content, expressed as mg of calcium per 100 kcal of energy content of the formula, of less than 122 mg/100 kcal.

10. The infant formula according to claim 1, characterised by a calcium-to-phosphorus ratio of between 1.4 and 2.

11. The infant formula according to claim 1, characterised by an overall fat content, expressed as total lipid content, of between 20 and 45 wt. %.

12. The infant formula according to claim 1, characterised by a viscosity of between 20 and 100 cps, as measured in a Brookfield viscosimeter at 30 rpm.

13. The infant formula according to claim 1, characterised by a lactose content of at most 6,0 g/100 ml, of the total formula.

14. The infant formula according to claim 1, in which at least 30% of the palmitic acid residues in the triglycerides are in the Sn2 position of the triglycerides.

15. An infant formula comprising:
   a) a protein component having a phosphorus content of less than 0.75 g P/100 g protein; and
   b) a lipid component that can be easily digested by an infant, comprising fatty acid triglycerides in which palmitic acid residues make up more than 10% of all fatty acid residues present in the triglycerides in which the relative amounts of the components are:

| | |
|---|---|
| protein component a): | 6.4 to 16 wt. % |
| one lipid component b): | 18 to 29 wt. % |
| at least one prebiotic component c): | 0 to 15 wt. % |
| at least one viscosity improving component d): | 0 to 15 wt. % |
| further components: | 0 to 60 wt. % | to a total of 100 wt. % of the final formula.

16. The infant formula according to claim 15, in which:

| | |
|---|---|
| the relative amount of component c) is | 3.0 to 15 wt. %, |
| and/or the relative amount of component d) is: | 1.5 to 15 wt. %. |

17. The infant formula according to claim 15, in which at least 30% of the palmitic acid residue in the triglycerides are in the Sn2 position of the triglycerides.

18. An infant formula, comprising a protein hydrolysate of claim 17, further comprising b) at least one lipid component that can be easily digested by an infant.

19. A process for preparing a protein hydrolysate, comprising hydrolysing a protein starting material having a phosphorous content of less than 0.75 g P/100 protein with a combination of at least one endo- and at least one exoproteinase in which the starting material further contains a suspension of yeast cells in an amount of 1 to 8 g dry mass of yeast cells per 100 g protein.

20. The process according to claim 19, comprising hydrolysing a starting material comprising a milk protein, a mixture of milk proteins and/or a milk protein preparation.

21. The process according to claim 20, comprising hydrolysing proteins from mammal milk.

22. A protein hydrolysate obtained by the process of claim 19.

23. Infant formula, comprising a protein hydrolysate of claim 22.

24. Infant formula according to claim 22, further comprising
   b) at least one lipid component that can be easily digested by an infant; and optionally one or two of:
   c) at least one prebiotic component;
   d) at least one viscosity improving component.

25. A process for preparing a protein hydrolysate, comprising hydrolysing a protein starting material having a phosphorous content of less than 0.75 g P/100 protein with a combination of at least one endo- and at least one exoproteinase in which the combination of the endo- and exoproteinases is a mixture containing endopeptidase from *Bacillus lichenformis*, trypsin and endo- and exoproteinases from *Aspergillus oryzae*.

26. A protein hydrolysate obtained by the process of claim 25.

27. An infant formula, comprising a protein hydrolysate of claim 26, further comprising b) at leas one lipid component that can be easily digested by an infant.

28. A process for preparing a protein hydrolysate, comprising hydrolysing a protein starting material having a phosphorous content of less than 0.75 g P/100 protein with a combination of at east one endo- and at least one exoproteinase in which the hydrolysis is carried out at a temperature between 45 and 60° C., and is terminated by cooling the total hydrolysis mixture from the hydrolysis temperature to a temperature of less than 20° C., over a period of time of 10 m. to 1 hour.

29. A protein hydrolysate obtained by the process of claim 28.

* * * * *

UNITED STATES PATENT AND TRADEMARK OFFICE
CERTIFICATE OF CORRECTION

PATENT NO. : 6,863,918 B2  Page 1 of 1
APPLICATION NO. : 10/149986
DATED : March 8, 2005
INVENTOR(S) : Bindels et al.

It is certified that error appears in the above-identified patent and that said Letters Patent is hereby corrected as shown below:

Claim 1, Col. 19 line 10, change "phosphorous" to --phosphorus--;
line 11, change "P100" to --P/100--;
line 17, change "more then" to --no more than--.

Claim 5, Col. 19 line 41, change "glucas" to --glucans--.

Claim 13, Col. 19 line 66, change "6,0" to --6.0--.

Claim 19, Col. 20 line 37, change "phosphorous" to --phosphorus--.

Claim 25, Col. 20 line 60, change "phosphorous" to --phosphorus--.

Claim 27, Col. 21 line 2, change "leas" to --least--.

Claim 28, Col. 21 line 6, change "phosphorous" to --phosphorus--;
line 7, change "east" to --least--.

Signed and Sealed this

Seventeenth Day of July, 2007

JON W. DUDAS
*Director of the United States Patent and Trademark Office*